(12) United States Patent
Meyer

(10) Patent No.: US 10,182,683 B2
(45) Date of Patent: Jan. 22, 2019

(54) CHOP RACK

(71) Applicant: Steve Meyer, Van Meter, IA (US)

(72) Inventor: Steve Meyer, Van Meter, IA (US)

(*) Notice: Subject to any disclaimer, the term of this patent is extended or adjusted under 35 U.S.C. 154(b) by 0 days.

(21) Appl. No.: 15/934,446

(22) Filed: Mar. 23, 2018

(65) Prior Publication Data

US 2018/0206679 A1    Jul. 26, 2018

Related U.S. Application Data

(62) Division of application No. 14/833,587, filed on Aug. 24, 2015, now Pat. No. 9,962,039.

(60) Provisional application No. 62/041,976, filed on Aug. 26, 2014.

(51) Int. Cl.
*A47J 37/06* (2006.01)
*A47J 43/18* (2006.01)

(52) U.S. Cl.
CPC .......... *A47J 43/18* (2013.01); *A47J 37/0694* (2013.01)

(58) Field of Classification Search
CPC ........ A47J 37/0694; A47J 43/18; A47J 37/00; A47J 37/04; A47J 37/06; A47J 37/07; A47J 37/0731; A47J 37/0763
USPC .......... 211/85.4; 99/380, 381, 384, 391–393, 99/399; 126/25 R, 38
See application file for complete search history.

(56) References Cited

U.S. PATENT DOCUMENTS

| | | | | |
|---|---|---|---|---|
| 388,473 A * | 8/1888 | Bissell | ................ | A47J 37/0694 126/153 |
| 563,467 A * | 7/1896 | Farwell | .................... | F24C 15/16 126/339 |
| 718,714 A * | 1/1903 | Larson | .................. | A47J 37/067 126/153 |
| 1,006,328 A * | 10/1911 | Widenhofer | ............ | D06F 57/08 211/181.1 |
| 1,263,863 A * | 4/1918 | Crossby | .............. | A47J 37/0763 126/339 |
| 2,360,026 A | 10/1944 | Wall | | |
| 2,376,640 A | 5/1945 | Wall et al. | | |
| 3,998,170 A * | 12/1976 | Gordon | .................. | A47B 45/00 108/137 |
| 4,200,040 A * | 4/1980 | MacRae | .................. | A47J 43/18 211/181.1 |
| 5,638,742 A * | 6/1997 | Kassaseya | ............... | A47J 43/18 211/181.1 |
| 6,119,588 A * | 9/2000 | Tiemann | .................. | A47J 43/18 211/181.1 |
| 6,142,321 A * | 11/2000 | West | ...................... | A47B 45/00 108/143 |
| D444,655 S * | 7/2001 | West | .............................. | D6/574 |
| D445,620 S * | 7/2001 | West | .............................. | D6/574 |
| 6,457,594 B1 * | 10/2002 | Tiemann | ................. | A47J 36/22 211/181.1 |
| 6,595,120 B1 * | 7/2003 | Tiemann | ............. | A47J 37/0694 211/181.1 |

(Continued)

*Primary Examiner* — Joshua E Rodden
(74) *Attorney, Agent, or Firm* — Zarley Law Firm, P.L.C.

(57) ABSTRACT

A chop rack that has a first and second sidewall that each has a set of spaced-apart slats connected along their respective lower edges that adjustably and selectively interlock with one another to form a cooking surface that allows for fine-tuned heat adjustments. Additionally, a central portion of both sidewalls does not have a slat to form an opening in the cooking surface to allow heat through to create even cooking conditions.

16 Claims, 5 Drawing Sheets

(56) References Cited

U.S. PATENT DOCUMENTS

D694,580 S        12/2013   Cloutier et al.
9,801,496 B1 *    10/2017   Lu ...................... A47J 37/0694

* cited by examiner

CHOP RACK

CROSS REFERENCE TO RELATED APPLICATION

This application is a divisional of U.S. application Ser. No. 14/833,587 filed Aug. 24, 2015, which claims the benefit of U.S. Provisional Application No. 62/041,976 filed Aug. 26, 2014.

BACKGROUND OF THE INVENTION

This invention relates to a chop rack. More specifically and without limitation, this invention is directed towards a chop rack and method of using the same.

When cooking chops it is conventional to cook the chops with the bone side down. The reason behind this is that chops require a long and slow cook to become tender as well as to be evenly cooked. Although it is conventional to cook chops in this fashion it can be difficult to accomplish.

In particular, when cooking chops that are no longer on a rack and are separated it is difficult to position them bone side down. The difficulty arises in that the bone does not sufficiently stabilize the chops and during the cooking process the chops fall over. Thus it is necessary to constantly check on the chops to ensure that none have fallen over, which even if discovered can be too late to prevent uneven or undesirable cooking.

Controlling the temperature when cooking chops is another problem in the art. Conventionally, an individual must expose chops to a heat source in a uniform fashion, thereby severely limiting the control the individual has over the heat source, especially in the case of fire. Thus there is a need in the art to control the exposure of a chop to a heat source, namely fire, to control the exposure of the chop to direct heat and to otherwise disperse the heat uniformly for a superior cook.

Thus it is a primary object of the invention to provide a chop rack that improves upon the state of the art.

Another object of the invention is to provide a chop rack that allows for simple bone down cooking.

Yet another object of the invention is to provide a chop rack that is simple to use.

Another object of the invention is to provide a chop rack that does not need supervision.

Yet another object of the invention is to provide a chop rack that is durable.

Another object of the invention is to provide a chop rack that has an intuitive design.

These and other objects, features, or advantages of the present invention will become apparent from the specification and claims.

SUMMARY OF THE INVENTION

A chop rack that has a tray with a base and sidewalls. Attached and extending upwardly from the tray is a plurality of spaced-apart support frames. Received and positioned over the support frame is a top assembly. Meat is received between the support frames such that the meat is maintained in an upright position, which in some embodiments allows a bone portion of the meat to come into contact with the base of the tray. Alternatively, a chop rack is provided that has a first and second sidewall that each has a set of spaced-apart slats connected along their respective lower edges that adjustably and selectively interlock with one another to form a cooking surface that allows for fine-tuned heat adjustments. Additionally, a central portion of both sidewalls does not have a slat to form an opening in the cooking surface to allow heat through to create even cooking conditions.

DETAILED DESCRIPTION

Figure 1:
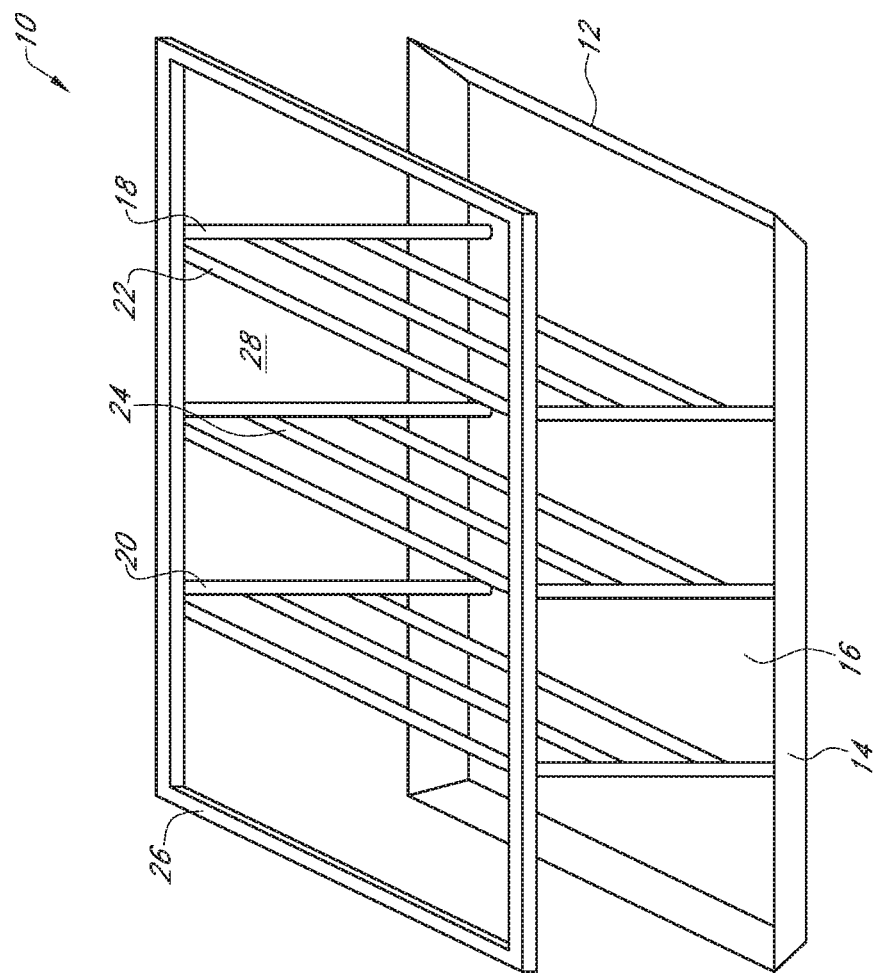
FIG. 1 is a perspective view of a chop rack.
Figure 2:
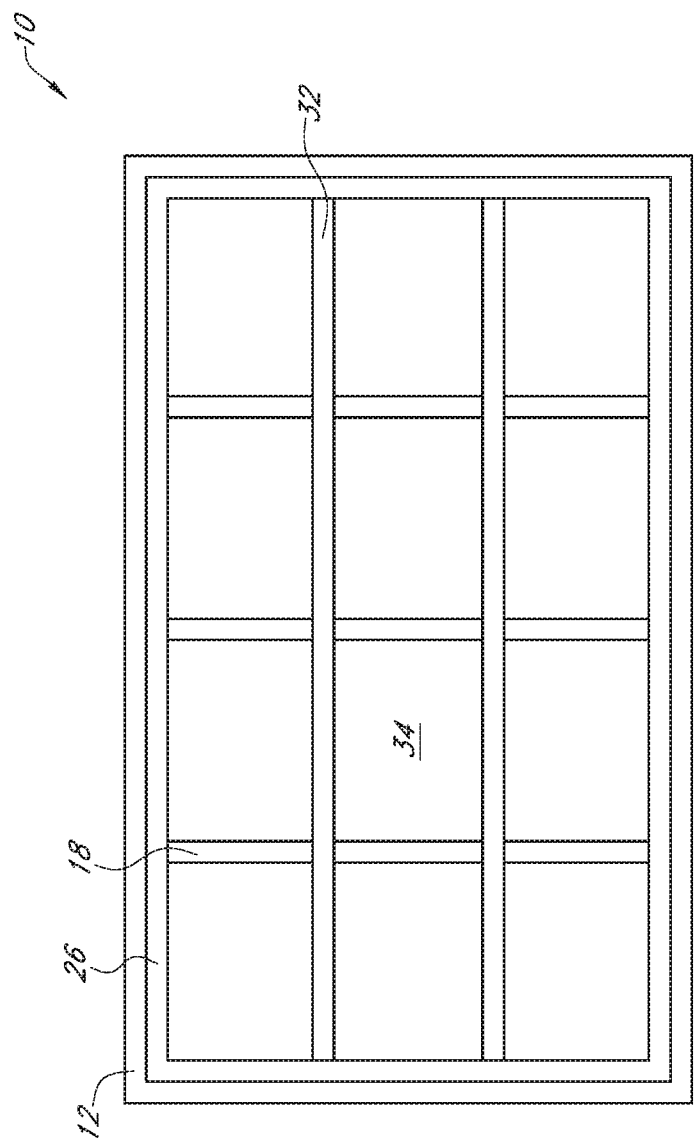
FIG. 2 is a top view of a chop rack.
Figure 3:
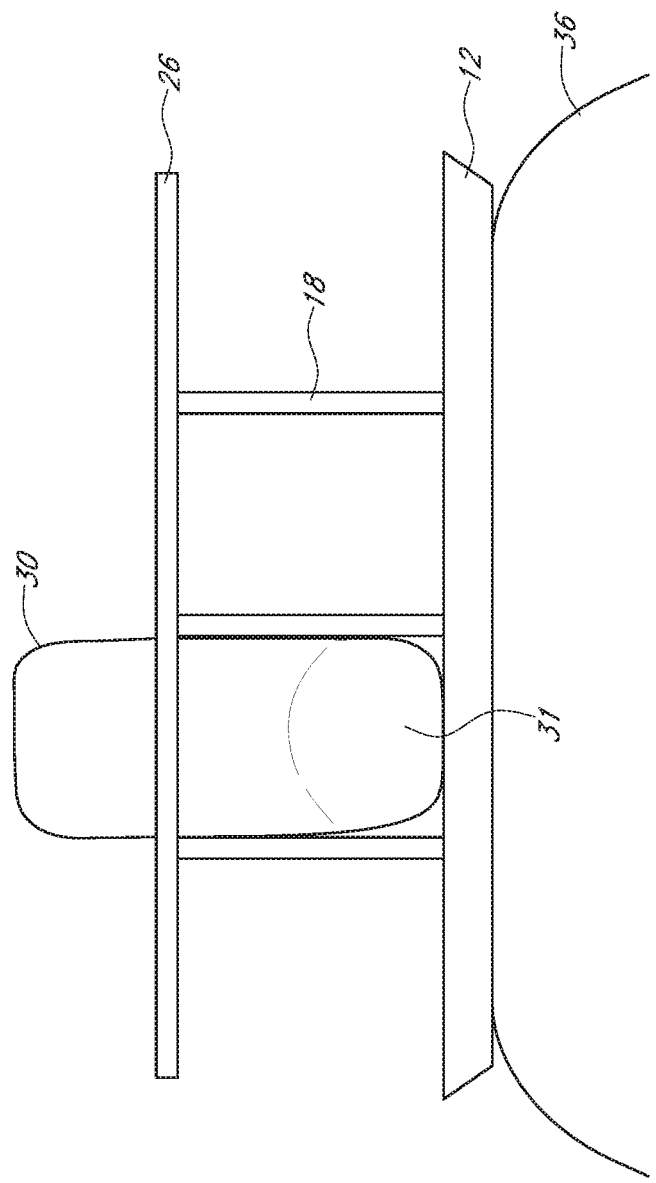
FIG. 3 is a side view of chop rack.
Figure 4:
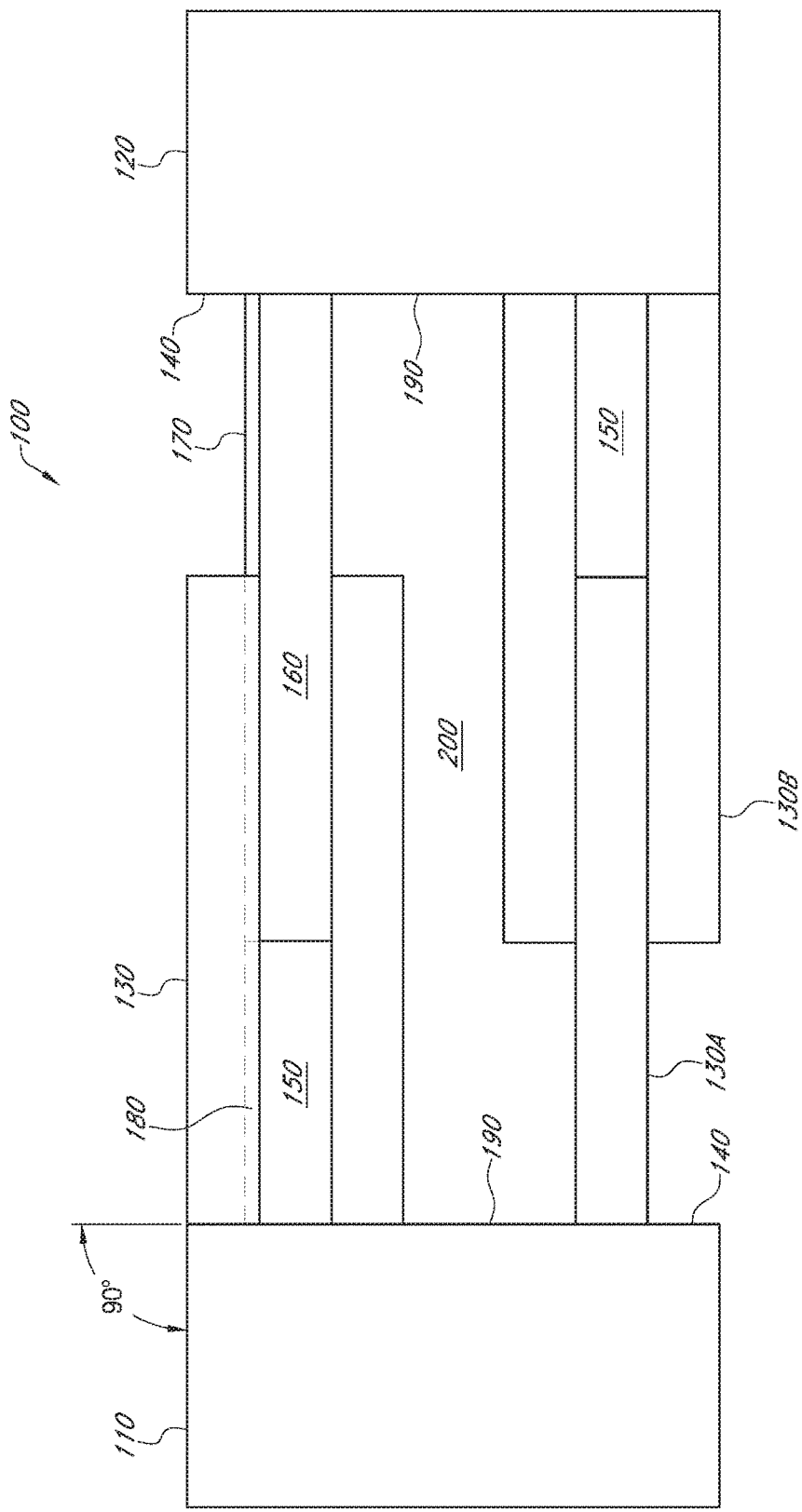
FIG. 4 is a top view of a chop rack.
Figure 5:
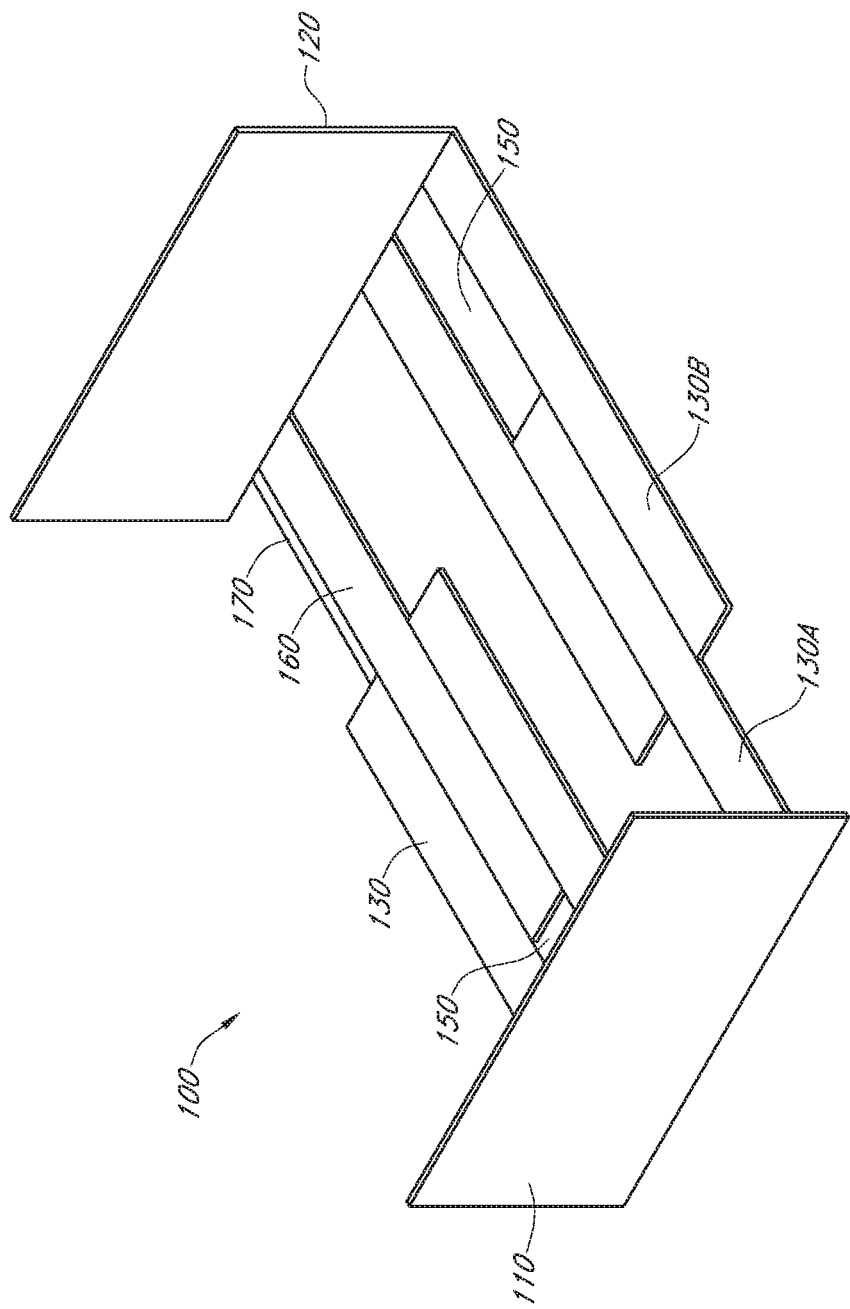
FIG. 5 is a perspective view of a chop rack.

With reference to the figures, a chop rack 10 is presented. The chop rack 10 has a tray 12 having a plurality of sidewalls 14 that slope outwardly. The tray 12 has a perforated base 16 but in other embodiments has slots, slits, or other openings to allow grease to pass through the tray 12. The tray 12 can be made of any heat resistant material. In an alternative arrangement, the tray 12 is simply a base 16 without sides 14. In yet another arrangement, the base 16 is not perforated but is instead solid.

Attached to and extending upward from the tray 12 are a plurality of support frames 18. The support frames 18 have a pair of frame sides 20 and a top 22. In the embodiment shown, the frame sides 20 and top 22 are made of metal rods, however they may also be metal sheets. Extending between the frame sides 20 are a plurality of support rods 24.

The support frames 18 are spaced closely together. In the arrangement shown, the support frames 18 are spaced such that they would accommodate a normal sized chop. In yet another arrangement the support frames 18 are pivotally attached to the tray 12, such that the support frames 18 can be laid down in the tray 12 when then the chop rack 10 is not in use.

A top assembly 26 is positioned over and received at the top of the support frames 18. Alternatively, the top assembly 26 is hingedly connected at one end of the chop rack 10. In one arrangement, the top assembly 26 is sized and shaped to fit around the plurality of support frames 18 with the central opening 28. An advantage of this arrangement is that it allows a meat product 30, such as a chop, to be positioned in between two support frames 18 and extends above the top 22 of the support frame 18 as well as the top assembly 26.

In alternative arrangements the top assembly 26 has at least one divider 32 that runs perpendicular to each of the support frames 18. In this arrangement a meat product 30 can be placed in a compartment 34 between the pair of support frames 18 and prevented from shifting to touch the other meat products 30 in other compartments 34. In this way, the entire exterior of the meat products 30 are exposed, while being prevented from contacting other meat products 30 or surfaces. In this embodiment or any other, the support frames 18, top assembly 26, and divider 32 are made of G5 wire to add additional rigidity, durability, and strength to the chop rack 10 while limiting costs.

In operation, an individual sears both sides of one or more meat products 30. Then the individual places the chop rack 10 on a heat source 36 with the base 16 of the tray 12 in contact with the heat source 36. Next, the individual places the seared meat products 30 between pairs of support frames 18. Preferably, the individual places the meat product 30 with a bone 31 of the meat product 30 coming into contact with the base 16 of the tray 12. In this way, the meat product's 30 upright position is maintained.

After the meat products 30 are positioned between the support frames 18, the individual places the top assembly 26 over the support frames 18 to keep them in place.

While cooking, the meat product 30 is held in place with the bone of the meat product 30 closest to the heat source to provide an even cook. While cooking, any grease that is formed passes through the perforated base 16 to prevent the hot grease from offsetting the cooking process. Additionally, the sloped sides 14 of the tray 12 prevent grease from spattering off the meat product 30 and harming anyone.

In an alternative embodiment, a chop rack 100 has a first sidewall 110 and a second sidewall 120. In one embodiment, the first sidewall 110 and the second sidewall 120 are flat planar sheets of metal, such as G5 or a food grade metal. In one arrangement the first sidewall 110 and second sidewall 120 measure 4 inches tall and 7.5 inches long. In another embodiment, the length is 8 inches. Connected to the first sidewall 110 and the second sidewall 120 are a sets of slats 130A and 130B. In one arrangement the sets of slats 130A and 130B are 9 inches long and 1 inch wide.

In one arrangement, the sets of slats 130A and 130B are rotatably and hingedly connected to a lower edge 140 of the first sidewall 110 and the second sidewall 120. In such an arrangement, the first sidewall 110 and second sidewall 120 can be laid flat with the sets of slats 130A and 130B when not in use for easy storage. When in use, the sets of slats 130A and 130B are rotated to a perpendicular position in respective relation to the first sidewall 110 and the second sidewall 120, such that the slats 130A attached to the first sidewall 110 extend away from the first sidewall 110 and towards the second sidewall 120 and the slats 130B attached to the second sidewall 120 extend away from the second sidewall 120 and towards the first sidewall 110.

In an alternative arrangement, the sets of slats 130A and 130B are in a fixed perpendicular connection with the lower edge 140 of the first sidewall 110 and the second sidewall 120. The sets of slats 130A and 130B in this arrangement are positioned along the lower edge 140 of the first sidewall 110 and second sidewall 120 so they face one another.

The sets of slats 130A and 130B are connected at spaced intervals along the lower edge 140 of the first sidewall 110 and second sidewall 120 thereby leaving gaps 150 between the slats 140. In this way, the slats 130A connected to the first sidewall 110 are received within the gaps 150 of the second sidewall 120 and the slats 130B of the second sidewall 120 are received in the gaps 150 of the first sidewall 110 to form a cooking surface 160.

In another arrangement, one or more slats 130 have a tabbed side 170 and a slotted or grooved side 180. In this arrangement, the tabbed side 170 of slat 130A connected to the first sidewall 110 overlaps with the slotted side 180 of the slat 130B such that the slats 130 interlock with one another when slid together.

In one embodiment of the invention, a central portion 190 of the first sidewall 110 and the second 120 does not have a slat 130, thereby leaving an opening 200 when the opposing slats 130 are interlocked with one another. In this way, when the chop rack 100 is heated, heat is allowed to enter the chop rack 100 to allow for more even cooking and more properly cooked meat.

In one particular arrangement of the invention, the first sidewall 110 has three slats 130A connected at 0 to 1 inch, 3 to 4 inches, and 5.5 to 6.5 inches along the front edge 140. The second sidewall 120 has three slats 130B connected at 2 to 3 inches, 4.5 to 5.5 inches, and 6.5 to 7.5 inches. In this transposed arrangement, the slats 130 leave an opening 200 of 1.5 inches at the central portion 190. When the first sidewall 110 and second sidewall 120 have a length of 8 inches, the positions are adjusted respectively to leave an opening of 2 inches at the central portion. In other embodiments, the opening 200 can be larger or smaller. During use the user can lengthen and shorten the interlocking distance of the sets of slats 130A and 130B of the first sidewall 110 and the second sidewall 120 thereby lengthening and shortening the size of the gaps 150, which in turns allows greater control over how meat products 30 are cooked and a superior cooking process.

From the above discussion, it will be appreciate that the chop rack 10 and 100 presented improves upon the state of the art. Thus it is a primary objective of the invention to provide a chop rack that improves upon the state of the art. That is, the chop rack presented allows for simple bone down cooking; is simple to use; does not need supervision; is durable; and has an intuitive design.

It will be appreciated by those skilled in the art that other various modifications could be made to the device without parting from the spirit and scope of this invention. All such modifications and changes fall within the scope of the claims that are intended to be covered thereby.

What is claimed is:

1. A chop rack comprising:
   a first sidewall connected to a first set of spaced-apart slats along a lower edge of the first sidewall, wherein a gap is positioned between each adjacent spaced-apart slat of the first set of spaced-apart slats;
   a second sidewall connected to a second set of spaced-apart slats along a lower edge of the second sidewall, wherein a gap is positioned between each adjacent spaced-apart slat of the second set of spaced-apart slats,
   wherein the second set of slats are positioned in a transposed, interlocking configuration in relation to the first set of slats such that at least one slat of the first set of spaced-apart slats is received between the gap formed between adjacent spaced-apart slats of the second set of spaced-apart slats and interlocks with both of the adjacent spaced-apart slats of the second set of spaced-apart slats; and
   the first sidewall and second sidewall having a central portion that does not have a slat forming an opening.

2. The chop rack of claim 1 wherein the first sidewall is connected to the first set of slats in a fixed perpendicular connection and the second sidewall is connected to the second set of slats in a fixed perpendicular connection.

3. The chop rack of claim 1 wherein the first sidewall is rotatably connected to the first set of slats and the second sidewall is rotatably connected to the second set of slats.

4. The chop rack of claim 1 further comprising the first set of slats and second set of slats selectively interlocking thereby forming a cooking surface.

5. The chop rack of claim 1 wherein the first sidewall and second sidewall are 4 inches tall and 7.5 to 8 inches long.

6. The chop rack of claim 1 wherein the first set of slats and the second set of slats are 9 inches long and 1 inch wide.

7. The chop rack of claim 1 wherein the central portion is 1.5 to 2 inches wide.

8. The chop rack of claim 1 wherein the first set of slats have a slat connected at 0 to 1 inch, 3 to 4 inches, and 5.5 to 6.5 inches and the second set of slats have a slat connected at 2 to 3 inches, 4.5 to 5.5 inches, and 6.5 to 7.5 inches.

9. The chop rack of claim 1 further comprising at least one slat of the first set of slats and the second set of slats having a tabbed side.

10. The chop rack of claim 1 further comprising at least one slat of the first set of slats and the second set of slats having a grooved side.

11. The chop rack of claim 1 wherein the opening extends to and between the first sidewall and the second sidewall.

12. A chop rack comprising:
   a first sidewall connected to a first set of three spaced-apart slats along a lower edge of the first sidewall, wherein a gap is positioned between a first slat and a second slat of the first set of three spaced-apart slats;
   a second sidewall connected to a second set of three spaced-apart slats along a lower edge of the second sidewall, wherein a gap is positioned between a second slat and a third slat of the second set of spaced-apart slats, and
   wherein the second set of slats are positioned in a transposed, interlocking configuration in relation to the first set of slats such that a first slat of the second set of three spaced-apart slats is received in the gap between the first slat and second slat of the first set of three spaced-apart slats and interlocks with both of the adjacent spaced-apart slats of the second set of spaced-apart slats, and a third slat of the first set of three spaced-apart slats is received in the gap between the second slat and third slat of the second set of three spaced-apart slats; the first sidewall and the second sidewall having a central portion that does not have a slat forming an opening.

13. The chop rack of claim 12 wherein when interlocked, the first set of three spaced-apart slats and the second set of three spaced-apart slats form a cooking surface.

14. The chop rack of claim 13 wherein the cooking surface is configured to be selectively adjustable, such that an area of the gaps is adjustable in length thereby allowing adjustment of heat when cooking.

15. The chop rack of claim 12 wherein the first slat of the first set of three spaced-apart slats is connected at 0 to 1 inches along the lower edge of the first sidewall, the second slat of the first set of three spaced-apart slats is connected at 3 to 4 inches along the lower edge of the first sidewall, the third slat of the first set of three spaced-apart slats is connected at 5.5 to 6.5 inches to 1 along the lower edge of the first sidewall, the first slat of the second set of three spaced-apart slats is connected at 2 to 3 inches along the lower edge of the second sidewall, the second slat of the second set of three spaced-apart slats is connected at 4.5 to 5.5 inches along the lower edge of the second sidewall, and the third slat of the second set of three spaced-apart slats is connected at 6.5 to 7.5 inches along the lower edge of the second sidewall.

16. The chop rack of claim 12 further comprising an opening extending to and between the first sidewall and the second sidewall, such that the opening is configured to provide even cooking conditions.

\* \* \* \* \*